US012476981B2

(12) United States Patent
Boutcher et al.

(10) Patent No.: US 12,476,981 B2
(45) Date of Patent: Nov. 18, 2025

(54) JOURNEY VALIDATION TOOL

(71) Applicant: BEACONSOFT LIMITED, London (GB)

(72) Inventors: Stewart Lawrence Boutcher, London (GB); Michael Anthony Townend, London (GB); Nigel Paul Bridges, London (GB)

(73) Assignee: BEACONSOFT LIMITED, London (GB)

( * ) Notice: Subject to any disclaimer, the term of this patent is extended or adjusted under 35 U.S.C. 154(b) by 0 days.

(21) Appl. No.: 18/257,463

(22) PCT Filed: Feb. 3, 2021

(86) PCT No.: PCT/GB2021/050238
§ 371 (c)(1),
(2) Date: Jun. 14, 2023

(87) PCT Pub. No.: WO2021/156612
PCT Pub. Date: Aug. 12, 2021

(65) Prior Publication Data
US 2024/0106837 A1 Mar. 28, 2024

(51) Int. Cl.
*H04L 9/40* (2022.01)
(52) U.S. Cl.
CPC .... *H04L 63/1408* (2013.01); *H04L 2463/144* (2013.01)
(58) Field of Classification Search
CPC .......... H04L 2463/144; G06Q 30/0277; G06Q 30/0248
See application file for complete search history.

(56) References Cited

U.S. PATENT DOCUMENTS 9,519,682 B1 12/2016 Pujara et al.
10,708,281 B1 * 7/2020 Modalavalasa .... H04N 21/2408
(Continued)

OTHER PUBLICATIONS

Voloch et al. 'An MST-based information flow model for security in Online Social Networks' IEEE, ICUFN, 2019, pp. 460-465 (Year: 2019).*

(Continued)

*Primary Examiner* — David R Lazaro
(74) *Attorney, Agent, or Firm* — Foley & Lardner LLP

(57) ABSTRACT

The present invention relates to a user digital journey validation method comprising the steps of: connecting, by a fully distributed blockchain computer system, a trust network comprising: a plurality of user nodes; a plurality of trusted party nodes; a visitor node corresponding to a visitor to a digital service; and a plurality of links, the user nodes corresponding to users, the trusted party nodes corresponding to trusted parties, the visitor node being the most recent node in the trust network, the links being the connections between nodes; rating, by the trust network, the visitor node, the rating being a visitor trust score; recording, via a digital journey mapping system, a digital journey of the visitor; analysing, by the AI system, the digital journey of the visitor; detecting, by the AI system, bot-like behaviour associated with the visitor node or the user nodes; assigning, by the AI system, a warning flag to the visitor node or the user if the visitor node or user node has associated bot-like behaviour; removing, by the AI system, any fraudulent nodes in the trust network, the fraudulent nodes being user nodes or visitor nodes having associated warning flags; updating, by the trust network, the visitor trust score based on the analysis results of the digital journey and the removal of any links connected to or from fraudulent nodes; and providing, by the AI system, a signal or value indicative of a degree of trustworthiness, to the digital service. The (Continued)

present invention aims to provide a means of validating whether a visitor of a digital service is a human.

22 Claims, 4 Drawing Sheets

(56) References Cited

U.S. PATENT DOCUMENTS

| | | | | |
|---|---|---|---|---|
| 11,153,351 | B2* | 10/2021 | Kalinin | H04L 63/1408 |
| 11,368,483 | B1* | 6/2022 | Senecal | H04L 63/1466 |
| 2011/0283359 | A1* | 11/2011 | Prince | H04L 63/1433 726/23 |
| 2018/0253755 | A1 | 9/2018 | Cheng et al. | |
| 2019/0122258 | A1* | 4/2019 | Bramberger | G06N 3/08 |
| 2019/0130440 | A1* | 5/2019 | Qiu | H04L 63/101 |
| 2019/0147451 | A1 | 5/2019 | Deutschmann et al. | |
| 2019/0333097 | A1* | 10/2019 | Sohum | H04L 63/101 |
| 2019/0370813 | A1* | 12/2019 | Bravick | H04L 9/3239 |
| 2020/0027089 | A1* | 1/2020 | Kuchar | H04L 9/3239 |
| 2020/0099714 | A1* | 3/2020 | Haridas | G06F 18/23 |
| 2020/0358819 | A1* | 11/2020 | Bowditch | G06F 17/18 |
| 2023/0054924 | A1* | 2/2023 | Brown | G06N 3/08 |
| 2024/0056479 | A1* | 2/2024 | Senecal | H04L 63/166 |
| 2024/0106837 | A1* | 3/2024 | Boutcher | G06Q 30/0248 |

OTHER PUBLICATIONS

Al-Oufi Samah et al: 11A group trust metric for identifying people of trust in online social networks 11, Expert Systems With Applications, vol. 39, No. 18,Dec. 15, 2012 (Dec. 15, 2012), pp. 13173-13181, XP028935471, ISSN: 0957-4174, DOI: 10.1016/J.ESWA. 2012.05.084 abstract p. 13173-p. 13180.

Anonymous: 11 reCAPTCHA—Wikipedia 11 , Jan. 11, 2020 (Jan. 11, 2020), pp. 1-8, XP055798995, Retrieved from the Internet: URL:https://en.wikipedia.org/w/index.php?title=ReCAPTCHA &oldid=935326099#cite note-25 [retrieved on Apr. 26, 2021] the whole document.

International Search Report and Written Opinion on PCT App. PCT/GB2021/050238 dated May 7, 2021 (16 pages).

Xue Yu et al: 11A Enhanced Trust Model Based on Social Network and Online Behavior Analysis for Recommendation 11 , Computational Intelligence and Software Engineering (CISE), 2010 International Conference On, IEEE, Piscataway, NJ, USA, Dec. 10, 2010 (Dec. 10, 2010), pp. 1-4, XP031841233, ISBN: 978-1-4244-5391-7 abstract p. 1-p. 4.

Zi Chu et al: 11 Blog or block: Detecting 1-22 blog bots through behavioral biometrics 11 , Computer Networks,vol. 57, No. 3, Feb. 1, 2013 (Feb. 1, 2013), pp. 634-646, XP055129268, ISSN: 1389-1286, DOI:10.1016/j.comnet.2012.10.005 abstract p. 634-p. 643.

International Search Report and Written Opinion issued in the PCT Application No. PCT/GB2021/050238.

GB Search Report for Application No. 2001719.0 mailing date Jul. 23, 2020, 1 page.

* cited by examiner

JOURNEY VALIDATION TOOL

CROSS-REFERENCE TO RELATED APPLICATIONS

This application claims the benefit of priority under 35 USC 371 to International Application No. PCT/GB2021/050238, filed on Feb. 3, 2021, which is hereby incorporated by reference in its entirety.

FIELD OF THE INVENTION

The present invention relates to user digital journey validation in digital marketing campaigns which involve digital advertisements. Particularly the present invention relates to an AD-fraud detection system wherein the journey validation tool provides a digital service with information useful for deciding whether a visitor is a human or software performing an automated task over the Internet (i.e. a bot).

BACKGROUND TO THE INVENTION

Over the past three decades, marketing has had to keep up and contend with leaps in technology and our relation to it ever since. The advent of the commercially available personal computer and portable internet connected devices, along with the internet, has arguably had the largest impact on marketing than any previous innovations. Where previously a sales team would utilise the telephone or the television, it has now become more commonplace to place advertisements on the internet.

It is difficult for organisations to reap the full benefits of digital marketing due to the presence of "Ad-fraud", when digital traffic for an advertisement is falsely recorded. Digital marketing campaigns are subject to average losses due to fraud and missing clicks of 30% (and, in extreme cases, some enterprises have reported 50% or more of clicks as bot clicks). As a result, advertisers wasted up to $19 billion of their digital advertising budget in 2019 alone.

Ad-fraud is difficult to stop as nefarious computer programs (also called "bots") mimic the actions of real users, meaning that the number of impressions and clicks by real people registered by digital advert clicks are inflated. Ad-fraud can ruin a business as an ad could be seen (measured as "impressions") or clicked by a bot that never ends up purchasing a product, thereby wasting the advertiser's money.

Current Ad-fraud solutions analyse server-side logs or network traffic. These solutions are effective in identifying fraudulent activity to a certain degree, but such single point solutions may not be effective at countering ever more sophisticated bot technology and in many cases is relatively easily bypassed.

It is therefore desirable to provide a means of validating a visitor to a digital service as a 'real human' proactively instead of reactively such that an advertiser can be assured that their investment is providing the desired benefit.

SUMMARY OF THE INVENTION

In accordance with a first aspect of the present invention, there is provided a digital user validation method comprising the steps of: connecting, by a fully distributed blockchain computer system including a central processor, a plurality of user nodes, a plurality of trusted party nodes, a visitor node corresponding to a visitor to a digital service, and a plurality of links, the user nodes corresponding to users, the trusted party nodes corresponding to trusted parties, the visitor node being the most recent node in the trust network, the links being connections between nodes; rating, by the trust network, the visitor node, the rating being a visitor trust score; recording, via a digital journey mapping system, a digital journey of the visitor; analysing, by the AI system, the digital journey of the visitor; detecting, by the AI system, bot-like behaviour associated with the visitor node or the user nodes; assigning, by the AI system, a warning flag to the visitor node or the user node if the if the visitor node or user node has associated bot-like behaviour; removing, by the AI system, any fraudulent nodes in the trust network, the fraudulent nodes being user nodes or visitor nodes having associated warning flags; updating, by the AI system, the visitor trust score based on the analysis results of the digital journey and the removal of any links connected to or from fraudulent nodes; and providing, by the AI system, a signal or value, indicative of a degree of trustworthiness, to the digital service.

The term "blockchain computing system" in the context of the present invention will be understood by the skilled addressee to include "distributed ledger technology".

Preferably, the visitor trust score is based on: the number of user nodes; user trust weightings each corresponding to a respective user node; the number of trusted party nodes; and trusted party trust weightings each corresponding to a respective trusted party node. In this way, the visitor trust score may dynamically change depending on the trust values of nodes present in the trust network.

Preferably, the digital journey of the visitor comprising a series of visitor interactions between the visitor and the said digital service, the said digital service being digital content. In this way, the digital journey of the visitor can be anonymously recorded. This may also be used to record visitor engagement.

Preferably, the present invention includes a computer program product including a program for a processing device, comprising software code portions for performing the steps of the user journey validation method, when the program is run on the processing device.

Preferably, the present invention includes the computer program product comprises a computer-readable medium on which the software code portions are stored, wherein the program is directly loadable into an internal memory of the processing device.

In accordance with a second aspect of the present invention, there is provided a user journey validation system for detecting and eliminating fraudulent activity, the fraudulent activity detection system comprising: a trust network; a fully distributed blockchain computer system; a digital journey mapping system; and an AI system; wherein the trust network comprises: a trust network comprising a plurality of nodes and a plurality of edges connecting the nodes, each of the edges between the nodes representing a single degree of separation between the nodes, the nodes comprising: a visitor node corresponding to a visitor; one or more user nodes, each corresponding to a user; and one or more trusted party nodes, each corresponding to a trusted party; and a visitor trust score; wherein the fully distributed blockchain computer system is configured to: continuously update the trust network in response to an interaction between a digital service and a visitor; implement the trust network using a blockchain ledger; and store the trust network in the blockchain ledger; wherein the digital journey mapping system is configured to anonymously record a digital journey of the visitor, the digital journey comprising a series of visitor interactions between the visitor and the digital service, the digital service being digital content; and wherein the AI system is configured to: analyse the digital journey and provide analysis results to the trust network such that the trust network is arranged to change the visitor trust score according to the analysis results.

Preferably, the visitor node is arranged to be the most recent node on the trust network. In this way, the visitor node preferably be configured to receive its trust score based on the nodes that precede the visitor node in the trust network.

Preferably, the user nodes each comprise an associated user trust weighting and an associated user trust score and the trusted party nodes each comprise an associated trusted party trust weighting and an associated trusted party trust score. In this way, the user nodes that have a high trust score (i.e. are more trustworthy) may be associated with a higher degree of trust. The same may be true for trusted party nodes (e.g. banks and government bodies) which may inherently be more trustworthy than an independent unverified node. Advantageously, all ad-related parties (nodes) may be connected through the hack-proof blockchain ledger and peer-to-peer validation may be possible to prove that the visitor is an actual human without exposing the visitor's personal data.

In preferable embodiments, the visitor trust score is calculated based on: the number of user nodes in the trust network; the number of trusted party nodes in the trust network; the user trust weighting associated with each of the user nodes in the trust network; the trusted party trust weighting associated with each of the trusted party nodes in the trust network; and the analysis results. In this way, the visitor trust score may be increased if the trust network comprises a higher number of user nodes that have a high trust rating (i.e. are more trustworthy) or a higher number of trusted party nodes. For example, if a visitor has visited a series of trusted party nodes associated with government bodies, the visitor trust score will be high. Advantageously, higher scored individuals and "verified" accounts (like banks) have more weight when authenticating someone else.

Preferably, the visitor node comprises an associated visitor trust score. In this way the visitor node may have a higher visitor trust score if the trust network comprises more trustworthy nodes (as a result of there being a higher number of trusted user nodes and trusted party nodes).

Preferably, the digital service comprises a trust threshold.

Preferably, the visitor can gain access to the digital service if the corresponding visitor trust score satisfies the trust threshold. In this way, if a visitor has a high trust score (indicating a high level of trustworthiness), they may be able to access the digital service. Therefore, if the visitor had previously been verified by, for example, government bodies, they may have a higher trust score and be more likely to gain access to the digital service.

Preferably, the visitor is presented with a verification step if the visitor trust score does not satisfy the trust threshold as defined solely by the digital service. In this way, even if the visitor has a lower trust score than is required to satisfy the trust threshold, they may still be able to gain access to the digital service if they pass the verification step which may be (but is not limited to) a 2 step verification or "call a number". A further potential consequence is that it may still be possible for the visitor to build on their visitor trust score by completing verification steps presented to them when they do not satisfy trust thresholds.

Preferably, either one of: the user does not gain access to the digital service or a warning flag is associated with the visitor if the visitor fails the verification step. In this way, the visitor may be flagged up to the AI system as potentially being a bot by the AI system.

Preferably, the digital journey mapping system is further configured to store a visitor engagement indicator, the visitor engagement indicator indicating visitor engagement with content items. In this way, the visitor's journey may be anonymously recorded—including all their activity. Thus, information can be associated with the user concerning the visitor's engagement. This information may be useful in further steps for Ad-fraud detection.

Preferably, the AI system is arranged to scan multiple digital services and multiple digital journeys simultaneously. In this way, many visitors may be recorded individually and at the same time.

Preferably, the AI system is further configured to detect suspicious behaviour of the users associated with the user nodes and create a warning flag in response to the suspicious behaviour. In this way, the digital service may be able to respond to block user nodes with warning flags associated with them. A further potential consequence is that if one of the users in the trust network was a bot, the AI system may recognise this and respond accordingly.

Preferably, the suspicious behaviour comprises: bot-like behaviour; or identity fraud.

Preferably, the warning flag is associated with the visitor node or the one or more user nodes that exhibited the suspicious behaviour.

Preferably, the AI system is configured to remove any user nodes or visitor nodes each associated with one or more warning flags in the trust network and update the network trust score and the user trust scores of the trust network. In this way, the AI system may shut down any fraudulent nodes in the trust network and update scores across the board such that the trust network remains constantly updated and retains its reliability.

Preferably, the AI system removes any user nodes or visitor nodes each associated with one or more warning flags in real time.

Preferably, the AI system comprises a machine learning AI-engine.

The AI system is preferably configured to analyse data in a database containing all ad-fraud detection information and is preferably arranged to learn from said data to improve the specific analytics responsible for Ad-fraud anticipation. The more data the AI system collects, the better and more refined the analytics are. The AI system is preferably arranged to continuously learn from false positives and improve the predictive power over time, both globally and on a per click basis.

DETAILED DESCRIPTION

Figure 1A:
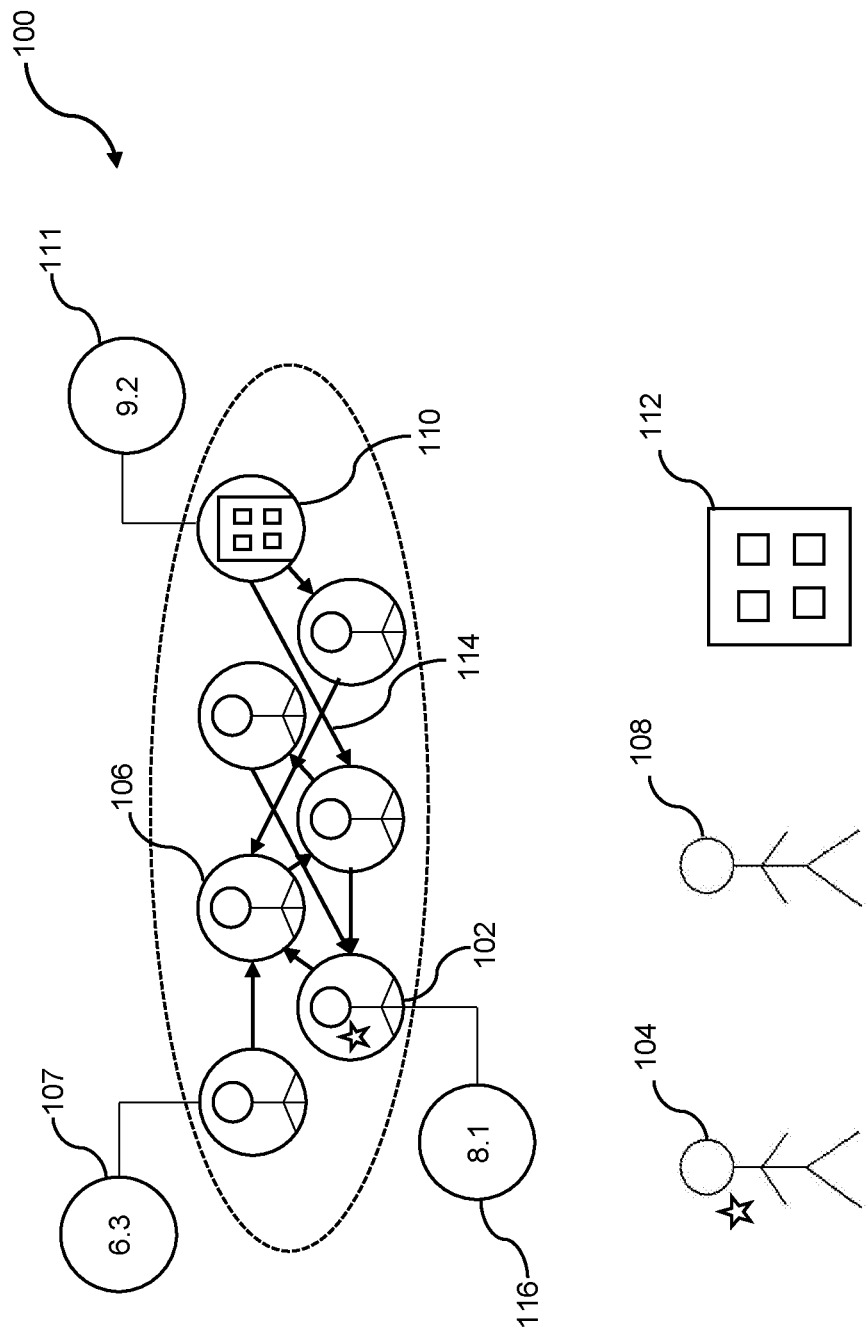
FIG. 1A shows a schematic view of a trust network in accordance with the present invention.

Referring to FIG. 1A, there is shown a schematic view of the trust network 100 in accordance with the present invention.

The trust network 100 comprises a visitor node 102 associated with a visitor 104, any number of user nodes 106 associated with any number of users 108 and any number of trusted party nodes 110 associated with any number of trusted parties 112. The trusted parties 112 may be, for example, banks or government bodies. The trust network further comprises any number of edges 114 representing connections 114 between different nodes within the trust network 100. The connections 114 are formed when the visitor 104, users 108 and trusted parties 112 authenticate each other's humanity/validity via one of a range of potential signings/validation technologies. The user nodes 106 each have an associated user trust score 107 and the trusted party nodes each have an associated trusted party trust score 111. Finally, the trust network 100 comprises a visitor trust score 116 corresponding to the trust network score 116.

In use, the visitor trust score 116 is created by the trust network 100. The trust network 100 creates the visitor trust score 116 based on the trust scores (107, 111) associated with each of the nodes within the trust network. Trusted party nodes 110 user nodes 106 with a high user trust score 107 have more weight when authenticating the visitor/other users 108 than user nodes 106 with a low user trust score 107.

Figure 1B:
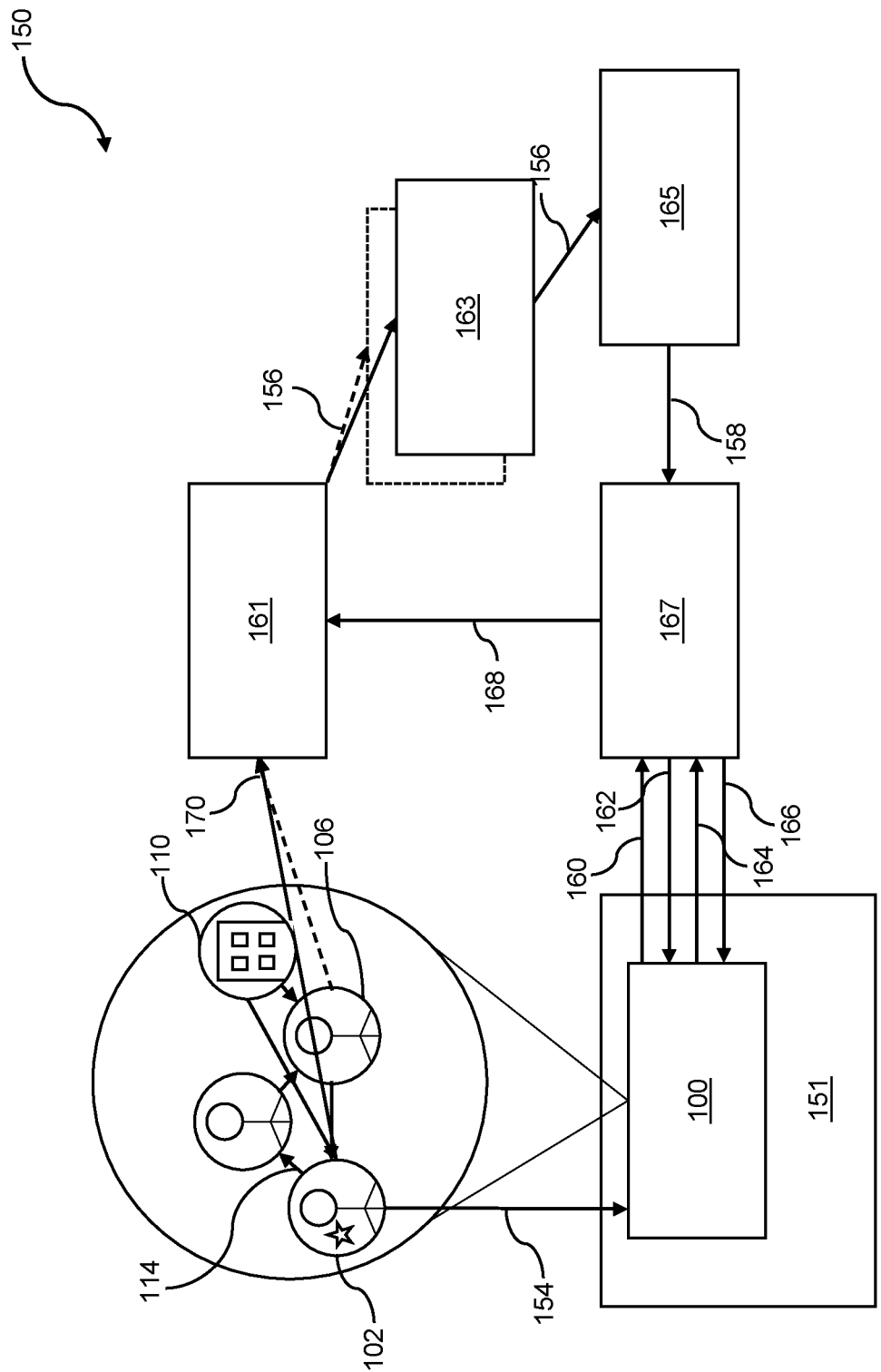
FIG. 1B shows a schematic view of a user journey validating system 150 according to a second aspect of the present invention.

Turning now to FIG. 1B, there is shown a schematic view of the user journey validating system 150 according to the second aspect of the present invention, configured to carry out the user journey validating method 200. FIG. 1B shows system features as apparatus and connections as arrows.

The user journey validating system 150 comprises the trust network 100, a fully distributed blockchain computer system 151, a digital journey mapping system 163 and a user journey 165.

The fully distributed blockchain computer system 151 is arranged to connect 114 the different nodes within the trust network 100. In addition, the fully distributed blockchain computer system 151 is arranged to continuously update the trust network 100 by either removing or rearranging the nodes and edges 102 within the trust network 100.

The user journey validating system 150 further comprises a digital journey mapping system 163 configured to anonymously record 156 the digital journey 165 of the visitor 104 associated with the visitor node 102. The digital journey mapping system 163 records 156 the digital journey 165 following the visitor 104 interacting 170 with a digital service 161. The digital journey 165 comprises a series of interactions between the visitor 104 and the digital service 161, the digital service 161 being, for example, a website. It should be noted that the digital journey mapping system 163 may record 156 user journeys associated with the user nodes 106 such that multiple digital journeys 165 are recorded 156.

The user journey validating system 150 further comprises an AI system 167. The AI system 167 is configured to analyse 158 the user journey 165 and detect 160 both suspicious and human indicative behaviour associated with the visitor node 102. The suspicious behaviour may be bot-like behaviour. It should be noted that the AI system 167 may analyse 158 and detect 160 suspicious behaviour associated with the digital journeys 165 of the user nodes 106 simultaneously such that multiple digital journeys 165 are recorded 156 by the digital journey mapping system 163 and analysed 158 by the AI system 167. The AI system 167 is further configured to assign 162 a warning flag to the visitor node 102 or user nodes 106 if suspicious behaviour is detected from the user journeys 165 of said nodes. The AI system 167 is also configured to remove 164 any fraudulent nodes within the trust network. Finally, the AI system is configured to provide 168, to the digital service 161, a signal or value indicative of suspicious behaviour being associated with the visitor node 102. The digital service 161 may respond accordingly by blocking the visitor 104 associated with the visitor node 102.

Figure 2:
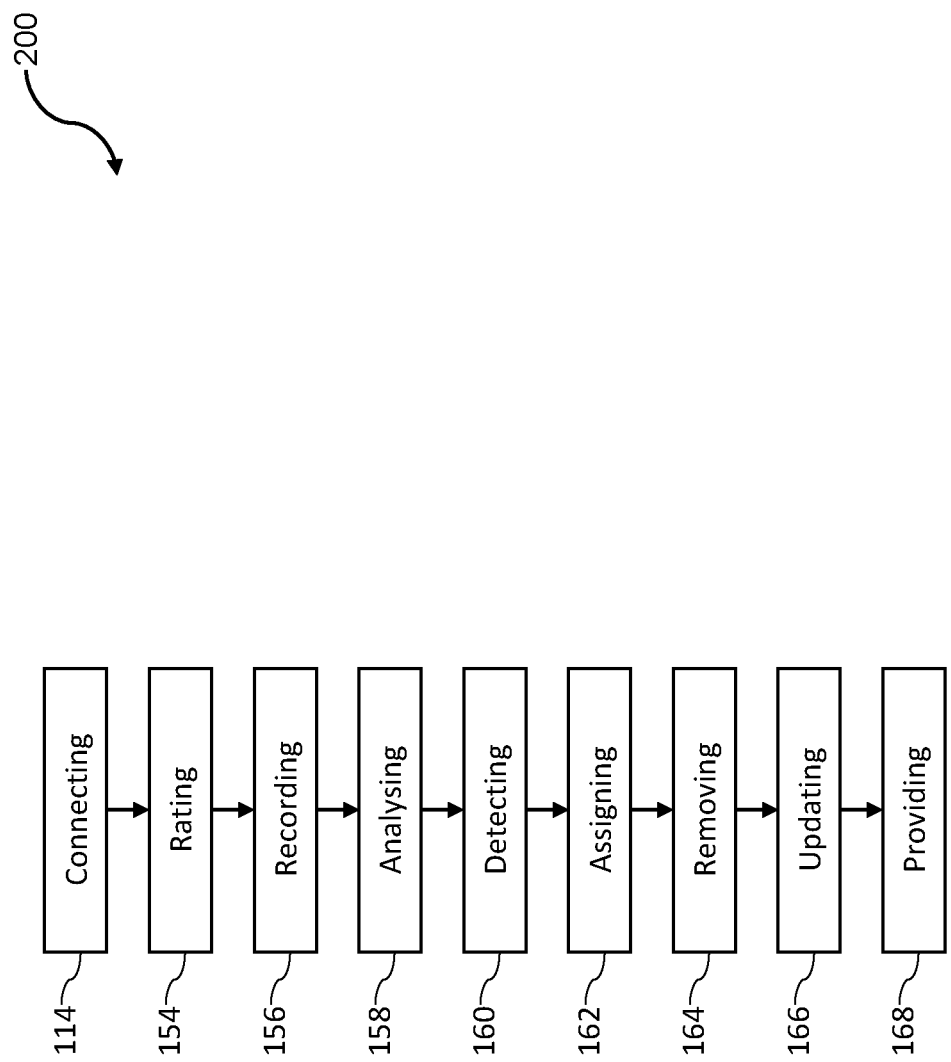
FIG. 2 shows a schematic view of a user journey validating method according to a first aspect of the present invention.

Referring to FIG. 2, there is shown a schematic view of the user journey validating method 200 according to the first aspect of the present invention. The user journey validating method 200 is configured to carry out the sequential steps of:

Connecting 114, by the fully distributed blockchain computer system 151, the trust network 100 comprising: a plurality of user nodes 106; a plurality of trusted party nodes 110; and a visitor node 102. The visitor node 102 corresponds to the visitor 104 of the digital service 112, the user nodes 106 correspond to users 108, the trusted party nodes 110 correspond to trusted parties 112. The visitor node 102 is the most recent node in the trust network 100.

Rating 154, by the trust network 100, the visitor node 102, the rating being a visitor trust score 116.

Recording 156, via a digital journey mapping system 163, a digital journey 165 of the visitor 104.

Analysing 158, by the AI system 167, the digital journey 165 of the visitor 104.

Detecting 160, by the AI system 167, bot-like behaviour associated with the visitor node 102 or the user nodes 106.

Assigning 162, by the AI system 167, a warning flag to the visitor node 102 or the user node 106 if the visitor node 102 or user node 106 has associated bot-like behaviour Removing 164, by the AI system 167, any fraudulent nodes in the trust network 100, the fraudulent nodes being user nodes 106 or visitor node 102 having associated warning flags.

Updating 166, by the trust network 100, the trust network score 116 based on the analysis results of the digital journey 165 and the removal of any fraudulent nodes.

Providing 168, by the AI system 167, a signal or value arranged as to be indicative of blocking the visitor 104 from accessing the digital service 112, if the visitor node 102 has a warning flag assigned.

In use, a visitor 104 attempts to access a digital service 161 (the digital service 161 being a third party) by, for example, clicking on an advertisement. The digital service 161 receives a visitor trust score 116 associated with the visitor node 102. If the visitor trust score 116 satisfies a trust threshold (for example by having a visitor trust score 116 that is greater than a minimum value required to satisfy the trust threshold) then the digital service 161 allows the visitor 104 to gain access to the digital service 161.

The visitor trust score 116 is created by a trust network 100. The trust network 100 comprises a visitor node 102, user nodes 106 (other individuals) and trusted nodes 110 (trusted organisations such as bank or government bodies). There may only be one visitor node 102 per trust network 100. Each of the nodes within the trust network 100 has an associated trust score. Some of the nodes within the trust network 100 contribute to the visitor trust score 116. It will be appreciated by the skilled addressee that each respective user node 106 in the trust network 100 is considered to be a visitor node 102 of a corresponding trust network 100

The trust network 100 is built as the visitor 104 interacts with different ad parties or trusted parties. For example, if the visitor 104 interacts 170 with the digital service 112 of a bank then that bank digital service 112 will be incorporated into the trust network 100. The trust score of each node within the trust network 100 influences the visitor trust score 116. A higher trust score (107, 111) associated with a node leads to a higher visitor trust score 116. As a result, if a visitor 104 interacts with a greater number of ad parties that each have a high trust score (107, 111) than if the visitor 104 had interacted with fewer high trust score (107, 111) ad parties, then the visitor trust score 116 would be greater. Additionally, if a visitor 104 interacts with ad parties that have a higher trust score (107, 111) than ad parties with a lower trust score (107, 111), then the visitor trust score 116 will be greater.

Following the visitor 104 gaining access to the digital service 161 by satisfying the trust threshold, the digital journey 163 associated with the visitor 104 is recorded 156 by the centralised AI system 167. The AI system 167 may also be used for recording user engagement for marketing/message validation. The AI system 167 analyses 158 the visitor 104's digital journey 165 and data acquired relating to the digital journey 165 is fed back into a trust network 100. The trust network 100 uses this data to refine and update 166 scores (107, 111, 116) associated with nodes (102, 106, 110) throughout the entire trust network 100. The AI system 167 scans multiple digital services 112 and user journeys 165 simultaneously. The AI system 167 determines whether the visitor 104 displays bot-indicative behaviour (examples include, but are not limited to: no touch point on a mobile device; no mouse movements on a laptop device; or mouse movement which is too accurate to be generated by a human measured on a pixel basis). The AI system 167 also detects when duplicate individual accounts associated with the visitor 104 are present in multiple web address locations at the same time—indicating identity fraud. If bot-like behaviour is detected, then the digital service 161 will be able to respond to block the visitor 104 with the associated bot-like behaviour from accessing the digital service 161. The AI system 167 and trust network 100 will then remove the visitor node 102 with corresponding blocked visitor 104 from the trust chain and the trust score is updated 166 to reflect the removal of the node. If duplicate individual accounts are detected 160, then the AI system 167 will create a warning flag. The digital service 112 may then respond by blocking if the digital services' 112 own trust threshold isn't met.

Figure 3:
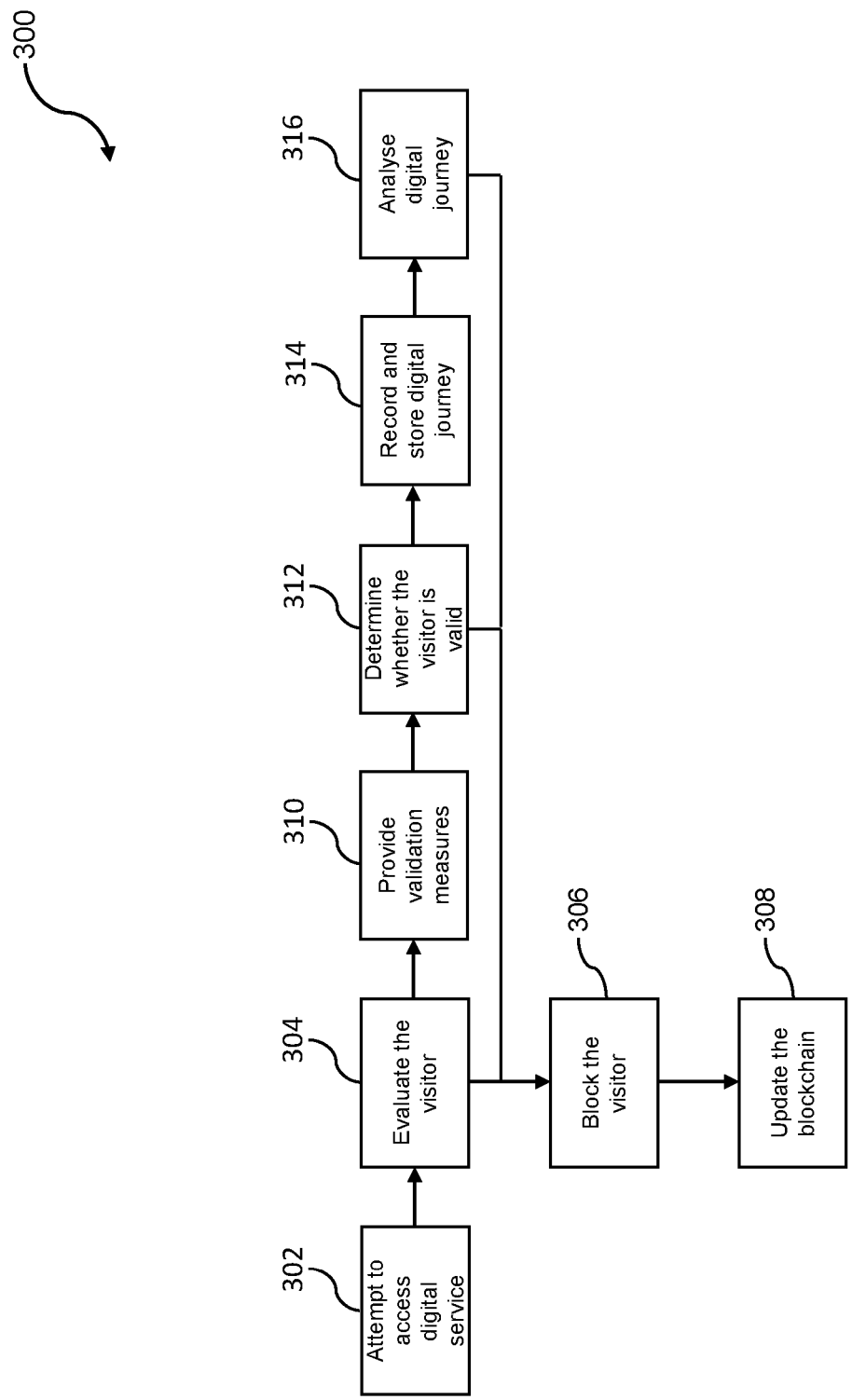
FIG. 3 shows a schematic view of a user journey validating method in an alternative embodiment.

In use in an alternative embodiment, with reference to FIG. 3, a visitor 104 attempts to access 302 a digital service 161 (the digital service 161 being a third party) by, for example, interacting with a digital advertisement associated with the digital service 161.

In response to the interaction, the AI system 167 evaluates 304 the visitor 104 based on a number of metrics. The metrics include, but are not limited to, an IP, a network, a browser signature, a JavaScript capability, and the visitor's 104 actions within the digital service. The AI system 167 evaluates 304 the visitor 104 by comparing the metrics to a predetermined list of known active bots stored in the blockchain computer system 151, each known active bot having a corresponding set of metrics. The AI system 167 determines that the visitor 104 meets a predetermined threshold similarity score to a known bot of the list of known active bots. The threshold similarity score is set at an appropriate level for the AI system 167 to be sure that the visitor 104 is similar enough to the known bot.

The AI system 167 then automatically notifies the digital service 161 that the visitor 104 has a metric profile that matches or is similar to the profile of the known bot. The visitor 104 is subsequently blocked 306 from accessing the digital service 161.

The AI system 167 also updates 308 the blockchain system 151 by assigning a warning flag to a visitor node 102 stored in the blockchain system 151. The visitor node 102 is associated with the visitor 104 and the warning flag is indicative of a metric profile matching a known bot. Future attempts to access a digital service 161, by the visitor 104 having the associated warning flag, can therefore be thwarted. The AI system 167 also updates 308 the block chain 151 by reducing a visitor trust score 116 of the visitor node 102, thereby reducing the chances of the visitor 102 accessing digital services 161, as discussed above in the method of FIG. 2.

If the AI system 167 determines in step 304 that the visitor 104 does not meet the threshold similarity score (i.e. the visitor 104 does not display similar enough metrics to a known active bot), they are "presumed human". Before access is granted, the AI system 167 or the digital service 161 provides 310 additional validation measurements. These validation measurements are selected by the AI system 167 or the digital service 161 and include, but are not limited to, CAPTCHA, smart device validation, mobile text validation, or browser JavaScript testing.

The AI system 167 or the digital service 161 determine 312 that the visitor 104 is valid based on the validation measurements. The visitor 104 is therefore able to access the digital service 161. If the AI system 167 or digital service 161 determine 314 that the visitor 104 is invalid based on the validation measurements, the visitor 104 is not granted access to the digital service 161. The visitor 104 is subsequently blocked 306 from accessing the digital service 161. The AI system 167 also updates 308 the blockchain system 151 by assigning a warning flag to the visitor node 102 stored in the blockchain system 151 and updating the visitor trust sore 116.

Following the visitor 104 accessing and being active on the digital service 161, the digital journey mapping system 163 records and stores 314 all interactions that the visitor 104 has with the digital service 161. That is, the digital journey mapping system 167 records and stores a digital journey 165 of the visitor 104. These interactions of the digital journey 165 include, but are not limited to, clicks, mouse movement, form fills, and time periods between any of the aforementioned interactions.

The AI system 167 subsequently and/or simultaneously analyses 316 the interactions of the digital journey 165. In particular, the AI system 167 determines whether the visitor displays bot-indicative behaviour (examples include, but are not limited to: no touch point on a mobile device; no mouse movements on a laptop device; or mouse movement which is too accurate to be generated by a human measured on a pixel basis). It should be noted that the AI system 167 analyses and detects bot-indicative behaviour associated with the digital journeys 165 of the visitor 104 across multiple different digital services 161 simultaneously. In this case, multiple digital journeys 165 are recorded by the digital journey mapping system 163 and analysed by the AI system 167.

Once the AI system 167 has determined that the visitor 104 has displayed bot-indicative behaviour on at least one of the associated digital journeys 165 across the one or more digital services 161, the visitor 104 is blocked 306 from accessing the digital service 161. The AI system 167 also updates 308 the blockchain system 151 by assigning a warning flag to the visitor node 102 stored on the blockchain system 151. The visitor node 102 is associated with the visitor 104 and the warning flag is indicative of bot-like behaviour of the visitor 104. The above process is in real-time such that if bot-indicative behaviour is detected for one of the digital journeys 165, the one or more digital services 161 are notified that the visitor 104 is a potential bot. The digital services 161 can then take immediate action by blocking any further access to the visitor 104 associated with the visitor node 102 stored on the blockchain system 151, including preventing the visitor 104 from seeing advertisements for the digital service 161 on any third party platforms such as Google or Facebook. The metrics associated with the visitor 104 having bot-like behaviour are also stored as an entry in the list of known active bots such that the AI system 167 can determine that a future visitor 104 accessing a digital service 161 is one of the known active bots. After a threshold time period has passed, and a particular known bot has not been detected, the bot will be removed from the list of known active bots such that the list is active and timely.

It will be appreciated that the above described embodiments are given by way of example only and that various modifications may be made to the described embodiments without departing from the scope of the invention as defined in the appended claims. For example, the digital service may be any digital service such as an advertisement, the trust network may comprise any number of nodes, the trust threshold may be any value decided by the digital service and the sequence of steps in the method may be of any order.

There may be user nodes and trusted nodes within the trust network that are not connected to the visitor node.

The steps of the method may be arranged in an alternative order.

Although the distributed blockchain computer system, the trust network, the digital journey mapping system and the AI system have been described in the context of being standalone/individual systems, they may be incorporated into any combination of each.

In the described embodiment the digital journey mapping system has been described as being separate to the AI system. However, embodiments exist wherein the digital journey mapping system is incorporated into the AI system.

The invention claimed is:

1. A user digital journey validation method comprising the steps of:
   a) connecting, by a fully distributed blockchain computer system, a trust network comprising: a plurality of user nodes; a plurality of trusted party nodes; a visitor node corresponding to a visitor to a digital service; and a plurality of links, the user nodes corresponding to users, the trusted party nodes corresponding to trusted parties, the visitor node being the most recent node in the trust network, the links being the connections between nodes;
   b) rating, by the trust network, the visitor node, the rating being a visitor trust score;
   c) recording, via a digital journey mapping system, a digital journey of the visitor;
   d) analysing, by the AI system, the digital journey of the visitor;
   e) detecting, by the AI system, bot-like behaviour associated with the visitor node or the user nodes;
   f) assigning, by the AI system, a warning flag to the visitor node or the user if the visitor node or user node has associated bot-like behaviour;
   g) removing, by the AI system, any fraudulent nodes in the trust network, the fraudulent nodes being user nodes or visitor nodes having associated warning flags;
   h) updating, by the trust network, the visitor trust score based on the analysis results of the digital journey and the removal of any links connected to or from fraudulent nodes; and
   i) providing, by the AI system, a signal or value indicative of a degree of trustworthiness, to the digital service.

2. The method according to claim 1, wherein the visitor trust score is based on: the number of user nodes;
   user trust weightings each corresponding to a respective user node;
   the number of trusted party nodes; and
   trusted party trust weightings each corresponding to a respective trusted party node.

3. The method according to claim 1, wherein the digital journey of the visitor comprising a series of visitor interactions between the visitor and the said digital service, the said digital service being digital content.

4. A computer program product including a program for a processing device, the computer program product comprising a non-transitory computer-readable medium on which software code portions are stored, the software code portions configured for performing the steps comprising:
   a) connecting, by a fully distributed blockchain computer system, a trust network comprising: a plurality of user nodes; a plurality of trusted party nodes; a visitor node corresponding to a visitor to a digital service; and a plurality of links, the user nodes corresponding to users, the trusted party nodes corresponding to trusted parties, the visitor node being the most recent node in the trust network, the links being the connections between nodes;
   b) rating, by the trust network, the visitor node, the rating being a visitor trust score;
   c) recording, via a digital journey mapping system, a digital journey of the visitor;
   d) analysing, by the AI system, the digital journey of the visitor;
   e) detecting, by the AI system, bot-like behaviour associated with the visitor node or the user nodes;
   f) assigning, by the AI system, a warning flag to the visitor node or the user if the visitor node or user node has associated bot-like behaviour;
   g) removing, by the AI system, any fraudulent nodes in the trust network, the fraudulent nodes being user nodes or visitor nodes having associated warning flags;
   h) updating, by the trust network, the visitor trust score based on the analysis results of the digital journey and the removal of any links connected to or from fraudulent nodes; and
   i) providing, by the AI system, a signal or value indicative of a degree of trustworthiness, to the digital service, when the program is run on the processing device.

5. A computer program product according to claim 4, wherein the program is directly loadable into an internal memory of the processing device.

6. A user journey validation system for detecting and eliminating fraudulent activity, the user journey validation system comprising:
   a trust network;
   a fully distributed blockchain computer system;
   a digital journey mapping system; and
   an AI system;
   wherein the trust network comprises:
      a trust network comprising a plurality of nodes and a plurality of edges connecting the nodes, each of the edges between the nodes representing a single degree of separation between the nodes, the nodes comprising: a visitor node corresponding to a visitor; one or more user nodes, each corresponding to a user; and one or more trusted party nodes, each corresponding to a trusted party; and
      a trust network score;

wherein the fully distributed blockchain computer system is configured to:
- continuously update the trust network in response to an interaction between a digital service and a visitor;
- implement the trust network using a blockchain ledger; and
- store the trust network in the blockchain ledger;

wherein the digital journey mapping system is configured to anonymously record a digital journey of the visitor, the digital journey comprising a series of visitor interactions between the visitor and the digital service, the digital service being digital content; and wherein the AI system is configured to:
- analyse the digital journey and provide analysis results to the trust network such that the trust network is arranged to change the trust network score according to the analysis results.

7. The system of claim 6, wherein the visitor node is arranged to be the most recent node on the trust network.

8. The system of claim 6, wherein the user nodes each comprise: an associated user trust weighting and an associated user trust score and wherein the trusted party nodes each comprise: an associated trusted party trust weighting and an associated trusted party trust score.

9. The system of claim 8, wherein the trust network score is calculated based on:
- the number of user nodes in the trust network;
- the number of trusted party nodes in the trust network;
- the user trust weighting associated with each of the user nodes in the trust network;
- the trusted party trust weighting associated with each of the trusted party nodes in the trust network; and
- the analysis results.

10. The system of claim 6, wherein the visitor node comprises an associated visitor trust score, the visitor trust score corresponding to the trust network score.

11. The system of claim 6, wherein the digital service comprises a trust threshold.

12. The system of claim 11, wherein the visitor can gain access to the digital service if the corresponding visitor trust score satisfies the trust threshold.

13. The system of claim 11 wherein the visitor is presented with a verification step if the visitor trust score does not satisfy the trust threshold as defined solely by the digital service.

14. The system of claim 13, wherein either one of: the user does not gain access to the digital service or a warning flag is associated with the user if the visitor fails the verification step.

15. The system of claim 6, wherein the digital journey mapping system is further configured to store a visitor engagement indicator, the visitor engagement indicator indicating visitor engagement with content items.

16. The system of claim 6, wherein the AI system is arranged to scan multiple digital services and multiple digital journeys simultaneously.

17. The system of claim 6, wherein the AI system is further configured to detect suspicious behaviour of the users associated with the user nodes and create a warning flag in response to the suspicious behaviour.

18. The system of claim 17, wherein the suspicious behaviour comprises:
- bot-like behaviour; or
- identity fraud.

19. The system claim 18, wherein the AI system is configured to remove any user nodes or visitor nodes each associated with one or more warning flags in the trust network and update the network trust score and the user trust scores of the trust network.

20. The system of claim 18, wherein the AI system removes any user nodes or visitor nodes each associated with one or more warning flags in real time.

21. The system of claim 17, wherein the warning flag is associated with the visitor node or the one or more user nodes that exhibited the suspicious behaviour.

22. The system of claim 6, wherein the AI system comprises a machine learning AI-engine.

* * * * *